United States Patent
Kurokawa

(10) Patent No.: US 6,426,775 B1
(45) Date of Patent: *Jul. 30, 2002

(54) IMAGE PICKUP APPARATUS WITH DISTANCE MEASUREMENT DEPENDENT ON OBJECT LIGHTING CONDITION

(75) Inventor: Shinji Kurokawa, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/714,190

(22) Filed: Sep. 16, 1996

(30) Foreign Application Priority Data

Sep. 20, 1995 (JP) .............................. 7-241793

(51) Int. Cl.[7] ........................ H04N 5/238; H04N 5/222; G03B 7/00
(52) U.S. Cl. ........................ 348/363; 348/362; 348/371
(58) Field of Search ................................ 348/362, 363, 348/364, 366, 370, 371, 372, 348; 396/61, 65, 67, 69, 89, 157, 159, 161, 165, 170

(56) References Cited

U.S. PATENT DOCUMENTS

| | | | | |
|---|---|---|---|---|
| 3,868,701 A | * | 2/1975 | Kawasaki .................... | 396/157 |
| 4,833,541 A | * | 5/1989 | Takuma et al. ............. | 348/364 |
| 5,019,911 A | * | 5/1991 | Okino et al. ................ | 348/364 |
| 5,097,340 A | * | 3/1992 | Tanabe et al. .............. | 348/371 |
| 5,260,738 A | * | 11/1993 | Yamagishi et al. ......... | 348/372 |
| 5,400,074 A | * | 3/1995 | Shimizu ...................... | 348/363 |
| 5,410,225 A | * | 4/1995 | Ishii et al. ................... | 348/371 |
| 5,459,511 A | * | 10/1995 | Uehara et al. ............... | 348/363 |
| 5,473,374 A | * | 12/1995 | Shimizu et al. ............. | 348/364 |
| 5,486,861 A | * | 1/1996 | Miyamoto et al. .......... | 348/362 |
| 5,602,614 A | * | 2/1997 | Ohtsuka et al. ............. | 396/61 |

* cited by examiner

Primary Examiner—Wendy R. Garber
Assistant Examiner—Luong Nguyen
(74) Attorney, Agent, or Firm—Robin, Blecker & Daley

(57) ABSTRACT

An image pickup apparatus is provided with an image sensor, a light emission part for illuminating an object by emitting light, a light measuring part for measuring a luminance of the object on the basis of a signal from the image sensor, a distance measuring part for measuring a distance to the object, an operation member for performing a first operation and a second operation for picking up an image of the object, and a control part for controlling the image sensor, the light emission part, the light measuring part and the distance measuring part in response to the first operation and the second operation of the operation member. In response to the first operation of the operation member, the control part causes the light measuring part to measure the luminance, determines whether or not light emission by the light emission part is necessary according to information on the luminance measured by the light measuring part and causes the distance measuring part to measure the distance, and in response to the second operation of the operation part, if light emission by the light emission part is necessary, the control part first controls an iris on the basis of information on the distance measured by the distance measuring part, causes the light emission part to emit light for a predetermined period of time and causes a preliminary exposure to be made on the image sensor, and then the control part causes the light emission part to emit light for a period of time decided on the basis of information on the luminance measured by the light measuring part during the preliminary exposure and causes a main exposure to be made on the image sensor.

7 Claims, 5 Drawing Sheets

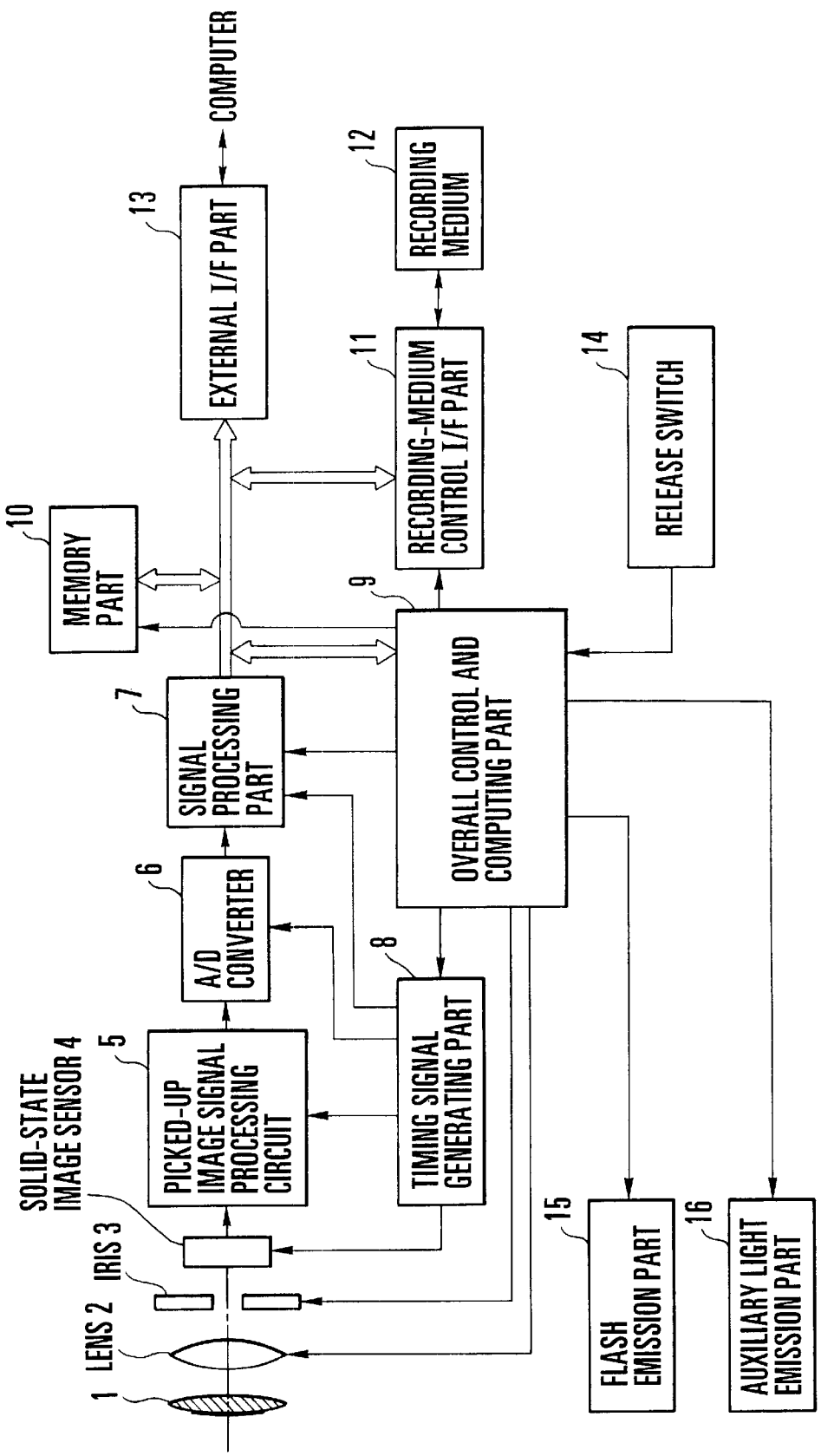
F I G. 1

FIG. 3

| G.No. | LIGHT EMISSION TIME |
|---|---|
| 0.53 | 10 |
| 2.35 | 30 |
| 3.76 | 60 |
| 4.91 | 100 |
| 6.34 | 180 |
| 7.46 | 300 |
| 8.34 | 500 |
| 8.78 | 700 |
| 9.03 | 1000 |
| 9.19 | 2000 |

UNIT
G.No. : ISO 100 · m
LIGHT EMISSION TIME : [ $\mu$ sec ]

IMAGE PICKUP APPARATUS WITH DISTANCE MEASUREMENT DEPENDENT ON OBJECT LIGHTING CONDITION

BACKGROUND OF THE INVENTION

1. Field of the Invention

This invention relates to an image pickup apparatus, such as an electronic camera, arranged to pick up an image by exposing an image sensor to an image light.

2. Description of the Related Art

During recent years, image pickup apparatuses such as an electronic camera or the like arranged to pick up an image by exposing an image sensor to an image light and display the image on a monitor, record the image on a recording medium or variously process or edit the image by taking the image into a personal computer either directly or through a recording medium, have become popular.

The image sensor employed in the electronic camera of such a kind has a narrow latitude for incident light. Therefore, the image sensor must be exposed to the image light in an accurate amount of exposure. In particular, accurate exposure control is required in a flash emission mode in which an image is to be picked up with the aid of a flash light.

Since the exposure latitude is narrow, the image pickup apparatus of this kind has generally employed, in the flash emission mode, such technique that, prior to a main exposure by which an image is actually picked up, a preliminary exposure is performed with a preliminary light emission made so as to measure an exposure condition for an object, an emission condition of a main light emission is obtained on the basis of light measurement data obtained as a result of the preliminary exposure, and the main exposure is then performed with the main light emission made under the emission condition.

In such conventional technique, the light emission time of the preliminary light emission is decided according to information on a distance to the object. In other words, the light emission time of the preliminary light emission is decided to be relatively long for an object located at a long distance and to be relatively short for an object located at a near distance.

However, according to the conventional technique, the maximum amount of emission of the main light emission naturally becomes smaller when the preliminary light emission has been made than when the preliminary light emission has not been made. Particularly, in the event of a long-distance object requiring a longer light emission time of the preliminary light emission, the charging voltage of a main capacitor remaining after the preliminary light emission decreases to a greater degree than in the event of a short-distance object. In that event, a disadvantage resulting from the decrease of energy for the main light emission becomes more serious.

Besides the decrease in charging voltage of the main capacitor caused by the preliminary light emission, the charging voltage remaining after the preliminary light emission comes to vary every time a shot is taken. Therefore, according to the conventional technique, in order to perform an accurate exposure during the main light emission, it is necessary to additionally provide some circuit for detecting the charging voltage of the main capacitor remaining after the preliminary light emission or to arrange some table or a formula relative to the remaining charging voltage. Such an arrangement is extremely disadvantageous with respect to the cost of manufacture or development of products.

SUMMARY OF THE INVENTION

This invention is directed to the solution of the problems mentioned in the foregoing. It is, therefore, an object of this invention to provide an exposure control method most apposite to an electronic camera.

It is another object of this invention to provide an image pickup apparatus having a simple exposure control arrangement for reduction in cost and also to provide an exposure control method for the image pickup apparatus.

To attain the above-stated objects, an image pickup apparatus arranged as a preferred embodiment of this invention comprises image pickup means, light emission means for illuminating an object by emitting light, light measuring means for measuring a luminance of the object on the basis of a signal from the image pickup means, distance measuring means for measuring a distance to the object, operation means for performing a first operation and a second operation for picking up an image of the object, and control means, in which, in response to the first operation of the operation means, the control means causes the light measuring means to measure the luminance, determines whether or not light emission by the light emission means is necessary according to information on the luminance measured by the light measuring means and causes the distance measuring means to measure the distance, and in response to the second operation of the operation means, if light emission by the light emission means is necessary, the control means first controls an iris on the basis of information on the distance measured by the distance measuring means, causes the light emission means to emit light for a predetermined period of time and causes a preliminary exposure to be made on the image pickup means, and then the control means causes the light emission means to emit light for a period of time decided on the basis of information on the luminance measured by the light measuring means during the preliminary exposure and causes a main exposure to be made on the image pickup means.

An image pickup apparatus arranged as another preferred embodiment of this invention comprises image pickup means, light emission means for illuminating an object by emitting light, light measuring means for measuring a luminance of the object on the basis of a signal from the image pickup means, distance measuring means for measuring a distance to the object, operation means for performing a first operation and a second operation for picking up an image of the object, and control means, in which, in response to the first operation of the operation means, the control means causes the light measuring means to measure the luminance, determines whether or not light emission by the light emission means is necessary according to information on the luminance measured by the light measuring means and causes the distance measuring means to measure the distance, and in response to the second operation of the operation means, if light emission by the light emission means is necessary, the control means first controls an iris into an aperture value having a greater amount of stopping-down selected from between an aperture value decided on the basis of information on the distance measured by the distance measuring means and an aperture value decided on the basis of a program diagram, causes the light emission means to emit light for a predetermined period of time and causes a preliminary exposure to be made on the image pickup means, and then the control means causes the light emission means to emit light for a period of time decided on the basis of information on the luminance measured by the light measuring means during the preliminary exposure and causes a main exposure to be made on the image pickup means.

The above and other objects and features of this invention will become apparent from the following detailed description of embodiments thereof taken in connection with the accompanying drawings.

BRIEF DESCRIPTION OF THE DRAWINGS

FIG. 1 is a block diagram showing the arrangement of a first embodiment of this invention.

FIG. 3 is a table arranged to be used in the first embodiment of this invention.

DETAILED DESCRIPTION OF THE PREFERRED EMBODIMENTS

Figure 2:
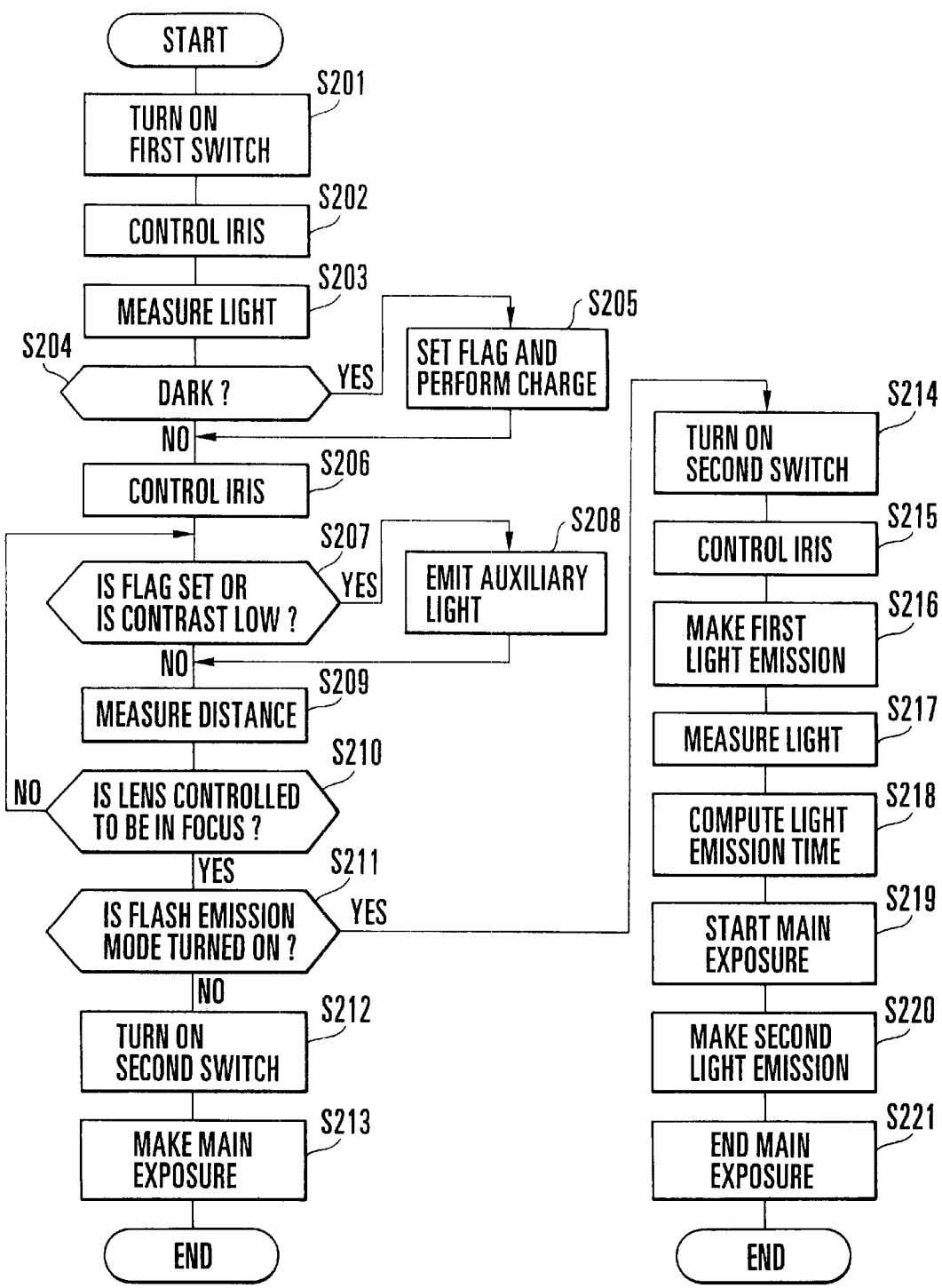
FIG. 2 is a flow chart showing an operation of the first embodiment of this invention.
Figure 4:
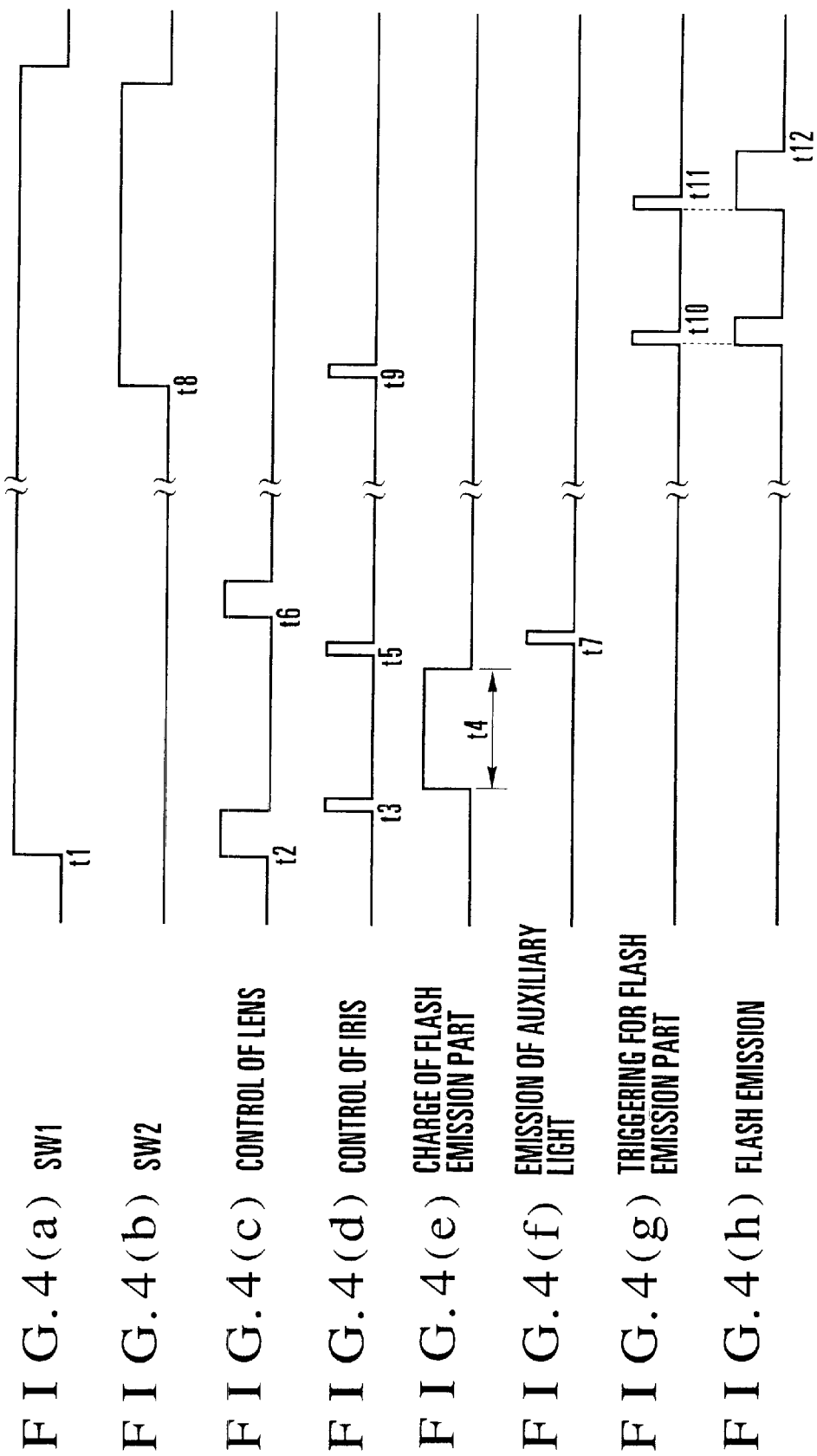
FIGS. 4(a) to 4(h) show in a timing chart the actions of the first embodiment of this invention.

Image pickup apparatuses arranged as embodiments of this invention are described in detail below with reference to the accompanying drawings.

(First Embodiment)

FIG. 1 is a block diagram showing a still video camera arranged as a first embodiment of this invention.

Referring to FIG. 1, a barrier 1 is arranged to serve as a lens protector and as a main switch of the still video camera. A lens 2 is arranged to form an optical image of an object on a solid-state image sensor 4 through an iris 3. The solid-state image sensor 4 is arranged to take in as an image signal the object image formed by the lens 2. A picked-up image signal processing circuit 5 is arranged to carry out processes such as various corrections, clamping, etc., on the image signal outputted from the solid-state image sensor 4. An A/D converter 6 is arranged to analog-to-digital convert the image signal outputted from the picked-up image signal processing circuit 5. A signal processing part 7 is arranged to make various corrections on image data outputted from the A/D converter 6 and to compress the image data. A timing signal generating part 8 is arranged to output timing signals of varied kinds to the solid-state image sensor 4, the picked-up image signal processing circuit 5, the A/D converter 6 and the signal processing part 7. An overall control and computing part 9 is arranged to perform computing operations of varied kinds and to control the whole still video camera.

A memory part 10 is arranged to temporarily store the image data. A recording-medium control interface (I/F) part 11 is provided for recording or reading on or from a recording medium 12. The recording medium 12 is a semiconductor memory or the like which is arranged to permit recording or reading image data on or from it. An external interface (I/F) part 13 is arranged to permit communication with an external computer or the like. A shutter release switch 14 is arranged to have a first stroke (first operation) and a second stroke (second operation). The still video camera is further provided with a flash emission part 15 and an auxiliary light emission part 16.

An operation of the still video camera which is arranged as the first embodiment of this invention as described above is next described below with reference to FIG. 2 which is a flow chart.

When the barrier 1 is opened, a main power supply is turned on. A power supply for a control system is next turned on. An AF (automatic focusing) lens, which is involved in automatic focus adjustment and is, for example, a focusing lens in the case of a zoom lens, is driven to move to its reset position. The flow of operation of the still video camera then waits for turning-on of a first switch which is arranged to turn on in response to the first stroke of the release switch 14. When the first switch is turned on at a step S201, the AF lens is again driven to move to a predetermined position, and a power supply which is provided for the circuits of an image pickup system including the picked-up image signal processing circuit 5, the A/D converter 6, etc., is turned on.

At a step S202, the overall control and computing part 9 causes the iris 3 to be fully opened. A signal outputted from the solid-state image sensor 4 and processed by the picked-up image signal processing circuit 5 is converted into image data by the A/D converter 6. The image data is inputted to the signal processing part 7. The overall control and computing part 9 then carries out a computing operation for an exposure on the basis of the image data processed by the signal processing part 7, at a step S203.

With a light measuring action carried out in this manner, the flow comes to a step S204. At the step S204, the result of the light measuring action is checked to find if it is dark. If not, the flow comes to a step S206. At the step S206, the overall control and computing part 9 controls the iris 3 according to the result of the light measuring action. If the result of the light measuring action is found to be dark, the flow of operation comes to a step S205. At the step S205, a flag is set and the overall control and computing part 9 causes a main capacitor of the flash emission part 15 to be sufficiently charged. The main capacitor is not charged if the result of the light measuring action is found to be not dark at the step S204.

At a step S207, a check is made to find if the flag is set or if the contrast of the object is low. If not, the flow comes to a step S209. If so, the flow comes to a step S208. At the step S208, the auxiliary light emission part 16 is caused to emit auxiliary light for distance measurement. After that, the flow comes to the step S209. At the step S209, a distance measuring action is caused to be carried out by the overall control and computing part 9 on the basis of a high frequency component taken out from the signal obtained by the solid-state image sensor 4 and outputted from the picked-up image signal processing circuit 5. After the step S209, the flow comes to a step S210. At the step S210, a check is made for an in-focus state by driving the AF lens. If the lens 2 is found to be not in focus, the distance measuring action is performed again by driving the AF lens.

After an in-focus state is obtained, the flow comes to a step S211 to make a check for a flash emission mode. At the step S211, if the flag is found to have been set up at the step S205 or if an external operation member which is provided for forcibly causing flash emission is found in a pushed state, the still video camera is considered to be in the flash emission mode. If not, the flow waits until turning-on of a second switch which is arranged to turn on in response to the second stroke of the release switch 14. When the second switch is turned on at the step S212, the flow comes to a step S213 to make a main exposure, and a photo-taking process of the still video camera comes to an end.

When the still video camera is judged at the step S211 to be in the flash emission mode, the flow comes to a step S214 to wait for turning-on of the second switch which turns on in response to the second stroke of the release switch 14. When the second switch is turned on, the flow comes to a step S215. At the step S215, the aperture of the iris 3 is controlled on the basis of the distance information obtained at the step S209. At a step S216, a preliminary exposure is performed by making a first light emission for a predetermined period of time. Control over the iris 3 at the step S215 is made in such a manner that, with the first light emission at the step S216 arranged to be made always at a fixed amount of light, a reflected light from the object which varies with a distance to the object and a reflection factor of the object is made incident on the solid-state image sensor 4 at an apposite amount of light. The aperture value of the iris 3 as controlled can be expressed as follows:

$$Av = 2 * Log_2(D/Y) + Y \quad (1)$$

wherein Av represents an aperture value, L represents information on the distance, and D and Y represent predetermined values.

With the amount of emission of the first light emission assumed to be constant, the predetermined values D and Y do not have to be varied. However, for the purpose of ensuring that the reflected light from the object is made incident on the solid-state image sensor 4 at an apposite amount of light, the amount of aperture control may be varied according to the shooting mode of the still video camera. For example, the amount of aperture control may be arranged to be variable according to a macro mode in which a photo-taking operation is performed at an extremely short distance, a document mode in which a picture of a paper having a high reflection factor is taken, a fill-in flash mode in which light is forcibly emitted in the event of backlighting, and a black-and-white mode in which an image is represented by contrast. It is of course possible to diversify these modes by combining them and to set the amount of aperture control in a more finely divided manner accordingly.

In order to prevent the charging electric energy for the second light emission from being decreased by the first light emission at the step S216, the maximum allowable amount of emission of the first light emission is preferably limited to an amount which is smaller by four or five steps than a full amount of emission, as long as it is a necessary and sufficient amount of emission for light measurement. In that case, the voltage drop of the charging capacitor caused by the first light emission is about 7 to 10% of the amount of full charging electric energy. Then, the voltage of electric charge remaining after the first light emission becomes almost a constant value.

After the first light emission, the flow comes to a step S217. At the step S217, the overall control and computing part 9 obtains a measured light value by computing the amount of reflected light from the object on the basis of data which is obtained from the signal processing part 7 after the picked-up signal coming from the solid-state image sensor 4 through the picked-up image signal processing circuit 5 is converted by the A/D converter 6. The measured light value is expressed as a difference from an apposite level. A guide number for the second light emission to be made for the main exposure is obtained by substituting the measured light value into a formula (2) shown below:

$$G.No. = 10^{a * \Delta Ev + b} \quad (2)$$

wherein G.No. represents a guide number, ΔEv represents a measured light value, and "a" and "b" represent predetermined values.

At a step S218, the overall control and computing part 9 computes a light emission time for the second light emission according to the guide number computed at the step S217 by using also a table of guide numbers and light emission times, which is as shown in FIG. 3 indicating the characteristic of the flash emission part 15 in use. At a step S219, the main exposure is started. At a step S220, the overall control and computing part 9 sends a flash triggering pulse to the flash emission part 15. The flash emission part 15 begins the second light emission in synchronism with the flash triggering pulse for the main exposure. The second light emission is brought to a stop when the light emission time obtained at the step S218 has elapsed. At a step S221, the main exposure comes to an end.

After completion of the main exposure at the step S221, the image signal obtained by the solid-state image sensor 4 and processed by the picked-up image signal processing circuit 5 is converted into image data by the A/D converter 6. The image data is processed by the signal processing part 7 and is written into the memory part 10 by the overall control and computing part 9. The data thus stored at the memory part 10 is sent through the recording-medium control I/F part 11 to be recorded under the control of the overall control and computing part 9 on the recording medium 12 which is, for example, a semiconductor memory or the like and is detachably mounted on the still video camera.

The timing of the flash emission in the first embodiment which is arranged as described above is next described as follows. Referring to FIGS. 4(a) to 4(h) which jointly show a timing chart, when the first switch SW1 of the release switch 14 is turned on at a time point t1, the AF lens is driven to move to a desired position at a time point t2. Then, the power supply for the picked-up image signal processing system including the picked-up image signal processing circuit 5 and the A/D converter 6 is turned on. At a point of time t3, the iris 3 is caused to be fully opened by the overall control and computing part 9. The overall control and computing part 9 computes the amount of light reflected from the object on the basis of the data obtained by the A/D converter 6 by converting the signal coming from the solid-state image sensor 4 through the picked-up image signal processing circuit 5. If the result of light measurement is judged to be dark, the overall control and computing part 9 causes the light emission capacitor of the flash emission part 15 to be charged sufficiently with electric energy during a period of time t4. At a point of time t5, the aperture position of the iris 3 is controlled.

Next, the overall control and computing part 9 computes a distance to the object on the basis of the signal coming from the solid-state image sensor 4 through the picked-up image signal processing circuit 5. At a point of time t6, the AF lens is driven to find if an in-focus state is obtained. If not, the distance to the object is again measured by driving the AF lens. If the brightness around the object is considered to be dark or if the object is found to have a low contrast, in measuring the distance to the object, the overall control and computing part 9 sends a light emitting signal to the auxiliary light emission part 16. Then, in response to the signal, the auxiliary light emission part 16 illuminates the object with an auxiliary light at a point of time t7.

After an in-focus state is obtained, the still video camera waits for turning-on of the second switch SW2 which turns on in response to the second stroke of the release switch 14. In the case of the flash emission mode, when the second switch SW2 is turned on at a point of time t8, the iris 3 is controlled into an aperture value obtained on the basis of the distance information, at a point of time t9. The overall control and computing part 9 controls and causes a flash triggering pulse to be sent to the flash emission part 15. Then, at a point of time t10, the flash emission part 15 makes the first light emission for a predetermined period of time in synchronism with the rise of the triggering pulse. The overall control and computing part 9 then computes the amount of light reflected from the object on the basis of data obtained by the A/D converter from a signal coming, as a result of the first light emission, from the solid-state image sensor 4 through the picked-up image signal processing circuit 5. The light emission time for the second light emission is decided according to the result of the light measuring action.

At a point of time t11, the overall control and computing part 9 causes a flash triggering pulse to be sent to the flash emission part 15. In synchronism with the rise of the triggering pulse, the flash emission part 15 begins to make the second light emission. At a point of time t12, the light emission is brought to a stop the instant the light emission time has elapsed.

As described above, the first embodiment is arranged to control the iris according to distance information obtained by making the first light emission with the light emission time of the first light emission arranged to be constant (for a predetermined time). According to the conventional method described in the foregoing, an over-exposure is caused by the first light emission in cases where the object is located at a near distance or has a high reflection factor, whereas the first light emission in the first embodiment gives an apposite exposure even in such a case. The light measurement thus can be accurately made at the time of the first light emission for the preliminary exposure. The second light emission which is to be determined for the main exposure according to the result of the first light emission, therefore, can be accurately carried out to ensure accurate execution of the main exposure. Further, since the remaining charging voltage after the first light emission can be kept almost constant by minimizing the discharge voltage resulting from the first light emission, the first embodiment necessitates use of only one kind of table in obtaining the light emission time for the second light emission. Besides, the first embodiment obviates the necessity of any additional detecting circuit for detecting the remaining charging voltage and any table or any related formula for deciding the light emission time according to the remaining charging voltage. This is a great advantage in respect to the cost of manufacture and development of products.

(Second Embodiment)

The hardware arrangement of a still video camera according to a second embodiment of this invention is the same as what is shown in FIG. 1 which shows the first embodiment described. Therefore, the details of the hardware arrangement are omitted from the following description of the second embodiment.

Figure 5:
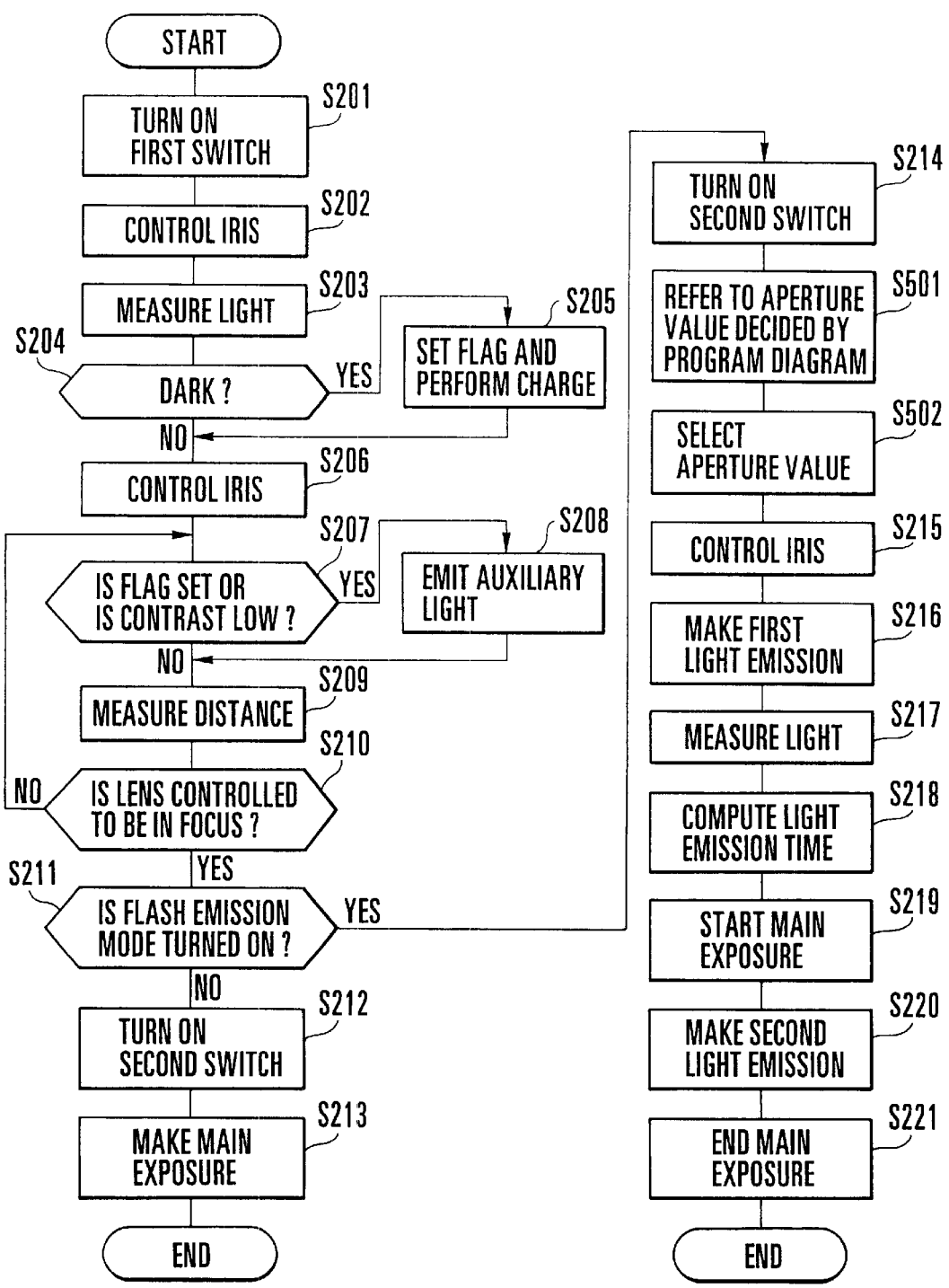
FIG. 5 is a flow chart showing an operation of a second embodiment of this invention.

A light emitting operation to be carried out in shooting is described below with reference to FIG. 5 which is a flow chart. In FIG. 5, the steps of the same actions as those of the flow chart of FIG. 2 are indicated by the same step numbers as in FIG. 2.

When the barrier 1 is opened, a main power supply is turned on. A power supply for a control system is next turned on. An AF lens is driven to its reset position. The flow of operation then waits for turning-on of a first switch which is arranged to turn on in response to the first stroke of the release switch 14. When the first switch is turned on at a step S201, the AF lens is again driven to move to a predetermined position, and a power supply which is provided for the circuits of an image pickup system including the picked-up image signal processing circuit 5, the A/D converter 6, etc., is turned on.

At a step S202, the overall control and computing part 9 causes the iris 3 to be fully opened. A signal outputted from the solid-state image sensor 4 and processed by the picked-up image signal processing circuit 5 is converted into image data by the A/D converter 6. The image data is inputted to the signal processing part 7. The overall control and computing part 9 then carries out a computing operation for an exposure on the basis of the image data processed by the signal processing part 7, at a step S203.

With a light measuring action carried out in this manner, the flow comes to a step S204. At the step S204, the result of the light measuring action is checked to find if it is dark. If not, the flow comes to a step S206. At the step S206, the overall control and computing part 9 controls the iris 3 according to the result of the light measuring action. If the result of the light measuring action is found to be dark, the flow of operation comes to a step S205. At the step S205, a flag is set and the overall control and computing part 9 causes a main capacitor of the flash emission part 15 to be sufficiently charged. The main capacitor is not charged if the result of the light measuring action is found to be not dark at the step S204.

At a step S207, a check is made to find if the flag is set or if the contrast of the object is low. If not, the flow comes to a step S209. If so, the flow comes to a step S208. At the step S208, the auxiliary light emission part 16 is caused to emit auxiliary light for distance measurement. After that, the flow comes to the step S209. At the step S209, a distance measuring action is caused to be carried out by the overall control and computing part 9 on the basis of a high frequency component taken out from the signal obtained by the solid-state image sensor 4 and outputted from the picked-up image signal processing circuit 5. After the step S209, the flow comes to a step S210. At the step S210, a check is made for an in-focus state by driving the AF lens. If the lens 2 is found to be not in focus, the distance measuring action is performed again by driving the AF lens.

After an in-focus state is obtained, the flow comes to a step S211 to make a check for a flash emission mode. At the step S211, if the flag is found to have been set up at the step S205 or if an external operation member which is provided for forcibly causing flash emission is found in a pushed state, the still video camera is considered to be in the flash emission mode. If not, the flow waits until turning-on of a second switch which is arranged to turn on in response to the second stroke of the release switch 14. When the second switch is turned on at the step S212, the flow comes to a step S213 to make a main exposure, and a photo-taking process of the still video camera comes to an end.

When the still video camera is judged at the step S211 to be in the flash emission mode, the flow comes to a step S214 to wait for turning-on of the second switch which turns on in response to the second stroke of the release switch 14. When the second switch is turned on, the flow comes to a step S501.

At the step S501, reference is made to a current aperture value decided according to a program diagram. At a step S502, the aperture value decided according to the program diagram is compared with an aperture value which is computed by the overall control and computing part 9 on the basis of the distance information obtained at the step S209, and one of the two aperture values indicating a greater stopped-down aperture than the other is selected (an aperture selecting method). The aperture selecting method is advantageous in a case where the influence of external light is not insignificant.

The aperture value obtained from the program diagram is naturally a value on the side of smaller stopped-down apertures in a case, for example, where a picture of an object located at a relatively far distance is to be taken by daylight synchronized flashing (fill-in flash) under a backlighting condition. The aperture value computed on the basis of the distance information, on the other hand, is a value on the side of larger open apertures in a case where the object is located at a relatively far distance, as will be understood from a formula (1) given hereinafter. However, in a case where the aperture value is on the side of larger open apertures while the object is under a backlighting condition such as in the case of a bright external light, the result of light measurement made after the first light emission might come to differ greatly from an apposite value, thereby making the computing operation for an apposite light emission time for the main exposure hardly possible. In such a case, therefore, the selection of an aperture value on the side of smaller stopped-down apertures becomes quite advantageous.

The aperture for the first light emission may be decided either on the basis of the distance information only, as in the case of the first embodiment, or in the selecting method as in the case of the second embodiment. Further, these aperture deciding modes may be arranged to permit switching from one mode over to the other. For example, the aperture is decided in the selecting method for daylight synchronized flash (fill-in flash) and is decided on the basis of the distance information in the case of shooting under a dark condition.

After the step S502, the flow comes to a step S215. At the step S215, the aperture position of the iris 3 is controlled into the aperture value selected. At a step S216, a preliminary exposure is performed by making a first light emission for a predetermined period of time. Control over the iris 3 on the basis of the distance information is made in such a manner that, with the first light emission at the step S216 arranged to be made always at a fixed amount of light, a reflected light from the object which varies with a distance to the object and a reflection factor of the object is made incident on the solid-state image sensor 4 at an apposite amount of light. The aperture value of the iris 3 as controlled on the basis of the distance information can be expressed as follows:

$$Av=2*Log_2(D/Y)+Y \qquad (1)$$

wherein Av represents an aperture value, L represents information on the distance, and D and Y represent predetermined values.

With the amount of emission of the first light emission assumed to be constant, the predetermined values D and Y do not have to be varied. However, for the purpose of ensuring that the reflected light from the object is made incident on the solid-state image sensor 4 at an apposite amount of light, the amount of aperture control may be varied according to the shooting mode of the still video camera. For example, the amount of aperture control may be arranged to be variable according to a macro mode in which a photo-taking operation is performed at an extremely short distance, a document mode in which a picture of a paper having a high reflection factor is taken, a fill-in flash mode in which light is forcibly emitted in the event of backlighting, and a black-and-white mode in which an image is represented by contrast. It is of course possible to diversify these modes by combining them and to set the amount of aperture control in a more finely divided manner accordingly.

In order to prevent the charging electric energy for the second light emission from being decreased by the first light emission at the step S216, the maximum allowable amount of emission of the first light emission is preferably limited to an amount which is smaller by four or five steps than a full amount of emission, as long as it is a necessary and sufficient amount of emission for light measurement. In that case, the voltage drop of the charging capacitor caused by the first light emission is about 7 to 10% of the amount of full charging electric energy. Then, the voltage of electric charge remaining after the first light emission becomes almost a constant value.

After the first light emission, the flow comes to a step S217. At the step S217, the overall control and computing part 9 obtains a measured light value by computing the amount of reflected light from the object on the basis of data which is obtained from the signal processing part 7 after the picked-up signal coming from the solid-state image sensor 4 through the picked-up image signal processing circuit 5 is converted by the A/D converter 6. The measured light value is expressed as a difference from an apposite level. A guide number for the second light emission to be made for the main exposure is obtained by substituting the measured light value into a formula (2) shown below:

$$G.No.=10^{a*\Delta Ev+b} \qquad (2)$$

wherein G.No. represents a guide number, ΔEv represents a measured light value, and "a" and "b" represent predetermined values.

At a step S218, the overall control and computing part 9 computes a light emission time for the second light emission according to the guide number computed at the step S217 by using also a table of guide numbers and light emission times, which is as shown in FIG. 3 indicating the characteristic of the flash emission part 15 in use. At a step S219, the main exposure is started. At a step S220, the overall control and computing part 9 sends a flash triggering pulse to the flash emission part 15. The flash emission part 15 begins the second light emission in synchronism with the flash triggering pulse for the main exposure. The second light emission is brought to a stop when the light emission time obtained at the step S218 has elapsed. At a step S221, the main exposure comes to an end.

After completion of the main exposure at the step S221, the image signal obtained by the solid-state image sensor 4 and processed by the picked-up image signal processing circuit 5 is converted into image data by the A/D converter 6. The image data is processed by the signal processing part 7 and is written into the memory part 10 by the overall control and computing part 9. The data thus stored at the memory part 10 is sent through the recording-medium control I/F part 11 to be recorded under the control of the overall control and computing part 9 on the recording medium 12 which is, for example, a semiconductor memory or the like and is detachably mounted on the still video camera.

The flash emission timing in the second embodiment is also the same as the timing shown in FIGS. 4(a) to 4(h) and is, therefore, omitted from description.

The same advantageous effects as those of the first embodiment are attainable by the second embodiment. In addition to these advantages, the second embodiment permits selection of a better aperture value by comparing an aperture value obtained on the basis of distance information and an aperture value obtained from a program diagram. The first light emission to be made for light measurement at the time of a preliminary exposure, therefore, can be carried out appositely to shooting conditions.

According to the arrangement of each of the embodiments described above thus permits an electronic camera to be arranged in a simple manner and yet to be capable of appositely and accurately performing a light measuring action in taking a shot with flash emission.

What is claimed is:

1. An image pickup apparatus comprising;

image pickup means;

light emission means for illuminating an object by emitting light;

light measuring means for measuring a luminance of the object on the basis of a signal from said image pickup means;

distance measuring means for automatically measuring a distance information to the object;

operation means for performing a first operation and a second operation for picking up an image of the object; and control means for controlling said image pickup means, said light emission means, said light measuring means, and said distance measuring means in response to the first operation and the second operation of said operation means, wherein, in response to the first operation of said operation means, said control means causes said light measuring means to measure the luminance, determines whether or not light emission by said light emission means is necessary according to information on the luminance measured by said light measuring means and causes said distance measuring means to automatically measure the distance to the object, and in response to the second operation of said operation means, if light emission by said light emission means is necessary, said control means first controls to determine according to a current shooting mode of said image pickup apparatus an iris value for a preliminary exposure by using the distance information outputted from said distance measuring means according to a predetermined function, causes said light emission means to perform a fixed amount of preliminary light emission and causes the preliminary exposure to be made on said image pickup means with the iris value determined according to the distance information, and then said control means causes said light emission means to perform a main light emission for a period of time decided on the basis of information of the luminance value measured by said light measuring means during the preliminary exposure and causes a main exposure to be made on said image pickup means.

2. An image pickup apparatus comprising:

image pickup means;

light emission means for illuminating an object by emitting light;

light measuring means for measuring a luminance of the object on the basis of a signal from said image pickup means;

distance measuring means for measuring a distance to the object;

operation means for performing a first operation and a second operation for picking up an image of the object; and control means for controlling said image pickup means, said light emission means, said light measuring means and said distance measuring means in response to the first operation and the second operation of said operation means, wherein, in response to the first operation of said operation means, said control means causes said light measuring means to measure the luminance, determines whether or not light emission by said light emission means is necessary according to information on the luminance measured by said light measuring means and causes said distance measuring means to measure the distance, and in response to the second operation of said operation means, if light emission by said light emission means is necessary, said control means first controls an iris into an aperture value having a greater amount of stopping-down selected from between an aperture value decided on the basis of information on the distance measured by said distance measuring means and an aperture value decided on the basis of a program diagram, causes said light emission means to emit light for a predetermined period of time and causes a preliminary exposure to be made on said image pickup means, and then said control means causes said light emission means to emit light for a period of time decided on the basis of information on the luminance measured by said light measuring means during the preliminary exposure and causes a main exposure to be made on said image pickup means.

3. An apparatus according to claim 2, wherein said control means is arranged to change over an aperture value according to a current shooting mode of said image pickup apparatus when controlling the iris on the basis of information on the distance.

4. An apparatus according to claim 2, wherein said light emission means is a flash device.

5. An apparatus according to claim 2, wherein said operation means is a shutter release switch.

6. An apparatus according to claim 2, wherein said control means is arranged to decide an aperture value of the iris on the basis of information on the distance measured by said distance measuring means, so that a predetermined amount of reflected light from the object can be obtained when a fixed amount of light is emitted by said light emission means.

7. An image pickup apparatus comprising:

image pickup means;

light emission means for illuminating an object by emitting light;

light measuring means for measuring a luminance of the object;

distance measuring means for automatically measuring a distance information to the object; and control means for causing said light measuring means to measure the luminance, and determine whether or not light emission by said light emission means is necessary according to information on a first luminance value measured by said light measuring means and causing said distance measuring means to automatically measure the distance information, said control means, in the case that light emission is determined to be necessary, causing said light emission means to perform a fixed amount of preliminary light emission with an iris value computed by using the distance information outputted from said distance measuring means according to a current shooting mode of said image pickup apparatus and causing said light measuring means to measure a second luminance value during the preliminary light emission, and determining a light amount of main light emission of said light emission means on the basis of the second luminance value.

* * * * *

UNITED STATES PATENT AND TRADEMARK OFFICE
CERTIFICATE OF CORRECTION

PATENT NO. : 6,426,775 B1
DATED : July 30, 2002
INVENTOR(S) : Shinji Kurokawa

It is certified that error appears in the above-identified patent and that said Letters Patent is hereby corrected as shown below:

<u>Title page,</u>
Item [57], ABSTRACT, delete in its entirety and insert
-- An image pickup apparatus comprises and image pickup device, a light emission units for illuminating an object by emitting light, a light measuring device for measuring a luminance of the object, a distance measuring device for measuring a distance to the object, and a control unit for causing the light measuring device to measure the luminance, the control unit determining whether or not light emission by the light emission device is necessary according to information on the luminance measured by the light measuring device and causing the distance measuring device to measure the distance under ambient light condition where light emisison is determined to be not necessary and causing the distance measuring device to measure the distance under light emission condition where light emission is determined to be necessary. --.

Signed and Sealed this

Fourth Day of November, 2003

JAMES E. ROGAN
*Director of the United States Patent and Trademark Office*